(12) United States Patent
Cole et al.

(10) Patent No.: US 8,073,770 B2
(45) Date of Patent: Dec. 6, 2011

(54) PERSON-TO-PERSON FUNDS TRANSFER

(75) Inventors: Kevin Cole, Charlotte, NC (US); Wanda P. Wick, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 402 days.

(21) Appl. No.: 12/349,571

(22) Filed: Jan. 7, 2009

(65) Prior Publication Data

US 2010/0174646 A1 Jul. 8, 2010

(51) Int. Cl.
*G06Q 40/00* (2006.01)
(52) U.S. Cl. ............... 705/39; 705/41; 705/42
(58) Field of Classification Search ............. 705/39, 705/41, 42; 235/379
See application file for complete search history.

(56) References Cited

U.S. PATENT DOCUMENTS

| | | | |
|---|---|---|---|
| 7,870,065 B2 * | 1/2011 | Gutierrez-Sheris | 705/39 |
| 2005/0043014 A1 | 2/2005 | Hodge | |
| 2006/0170530 A1 | 8/2006 | Nwosu et al. | |
| 2008/0033870 A9 | 2/2008 | Gutierrez-Sheris | |

OTHER PUBLICATIONS

International Search Report dated Mar. 15, 2010.

* cited by examiner

*Primary Examiner* — Daniel Felten
(74) *Attorney, Agent, or Firm* — Banner & Witcoff, Ltd.; Michael A. Springs

(57) ABSTRACT

Systems and methods are illustrated for performing a person-to-person funds transfer. A person-to-person funds transfer process may be divided into a funds transfer initiation process to receive the funds to be transferred and recipient information from a sender and a funds retrieval process to provide the funds to a recipient. The funds transfer initiation process may include a customizable authentication step that provides the sender an opportunity to determine the level of authentication. The funds transfer retrieval process may include determining whether the recipient is authenticated based on the authentication level chosen by the sender.

21 Claims, 5 Drawing Sheets

FIG. 4

| CASH TRANSFER AMOUNT | 0 – $100 | $100 - $1000 | $1000+ |
|---|---|---|---|
| AUTHENTICATION LEVEL | LOW AUTHENTICATION | MEDIUM AUTHENTICATION | STRICT AUTHENTICATION |
| AUTHENTICATION OPTION | RECIPIENT CODE | QUESTION/ANSWER | VOICE PRINT |

PERSON-TO-PERSON FUNDS TRANSFER

FIELD OF INVENTION

This invention generally relates to the field of person-to-person fund transfers.

BACKGROUND

Person-to-person fund transfers today generally involves two agents: a first agent that collects funds from a sender and initiates a transfer of funds to a recipient designated by the sender, and a second agent that completes the transfer by providing the recipient with the funds sent by the sender. Such a process, while functional, limits the sender and recipient in many ways. For example, because agents may be available to provide their services only during the work day, the sender and the recipient must schedule the transfer and collection at a time that conforms to the agent's availability, perhaps at the expense of the sender or recipient's convenience or needs. Recipients who need access to the funds immediately or during the non-work day cannot avail themselves of these services. In another example, the agent offices may be sparsely located, forcing a sender and recipient to travel long distances and therefore lengthening the period of time within which the funds passes between the sender and the recipient. In addition, security protocols sometimes require the recipient to provide the agent with some form of identification in order to collect the funds. Should the recipient neglect to bring appropriate identification, the recipient must leave the agent office empty-handed, expend additional effort to retrieve appropriate identification, and suffer a delay in obtaining the funds. Depending on the circumstances, convenience may not be the only thing sacrificed as a result of the delays inherent in this process; time-sensitive business transactions may be unraveled or personal emergencies unmet.

Security is another aspect of the person-to-person transfer that may be limited to policies set forth by the institution facilitating the funds transfer. Merely requiring a recipient to show picture identification might not be commensurate with the level of security recommended for the transfer of a substantially large amount of funds.

BRIEF SUMMARY

This summary is provided to introduce a selection of concepts in a simplified form that are further described in the Detailed Description. The summary is not intended to identify key features or essential features of the claimed subject matter, nor is it intended to limit the scope of the claimed subject matter.

In one aspect, a sender may set-up a funds transfer at an automated kiosk or an automated teller machine (ATM) without requiring assistance from an agent. The set-up may include identifying funds to be transferred to a recipient and selecting or otherwise designating a recipient for the funds. Upon completion of the set-up process, the kiosk or ATM may confirm that the sender has made the appropriate funds available (e.g., by depositing the funds to be transferred and any fees which may be required to complete the funds transfer) and initiate the delivery of a message (e.g., SMS text message, etc.) to the designated recipient. After receiving the text message, and upon authentication, the recipient may retrieve the transferred funds at the same or different kiosk or ATM without assistance from an agent.

In another aspect, the authentication of the recipient may be customizable and may include different levels of authentication. The levels of authentication may be based upon the amount of funds to be transferred or upon the request of the sender. In one example, biometrics (e.g., a voice print) may be used to authenticate the recipient. In another example, radio frequency identification (RFID) may be used to authenticate the recipient.

BRIEF DESCRIPTION OF THE DRAWINGS

FIG. 4 shows a table which may serve as the basis for a suggestion of the level of authentication according to one or more aspects of the invention.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
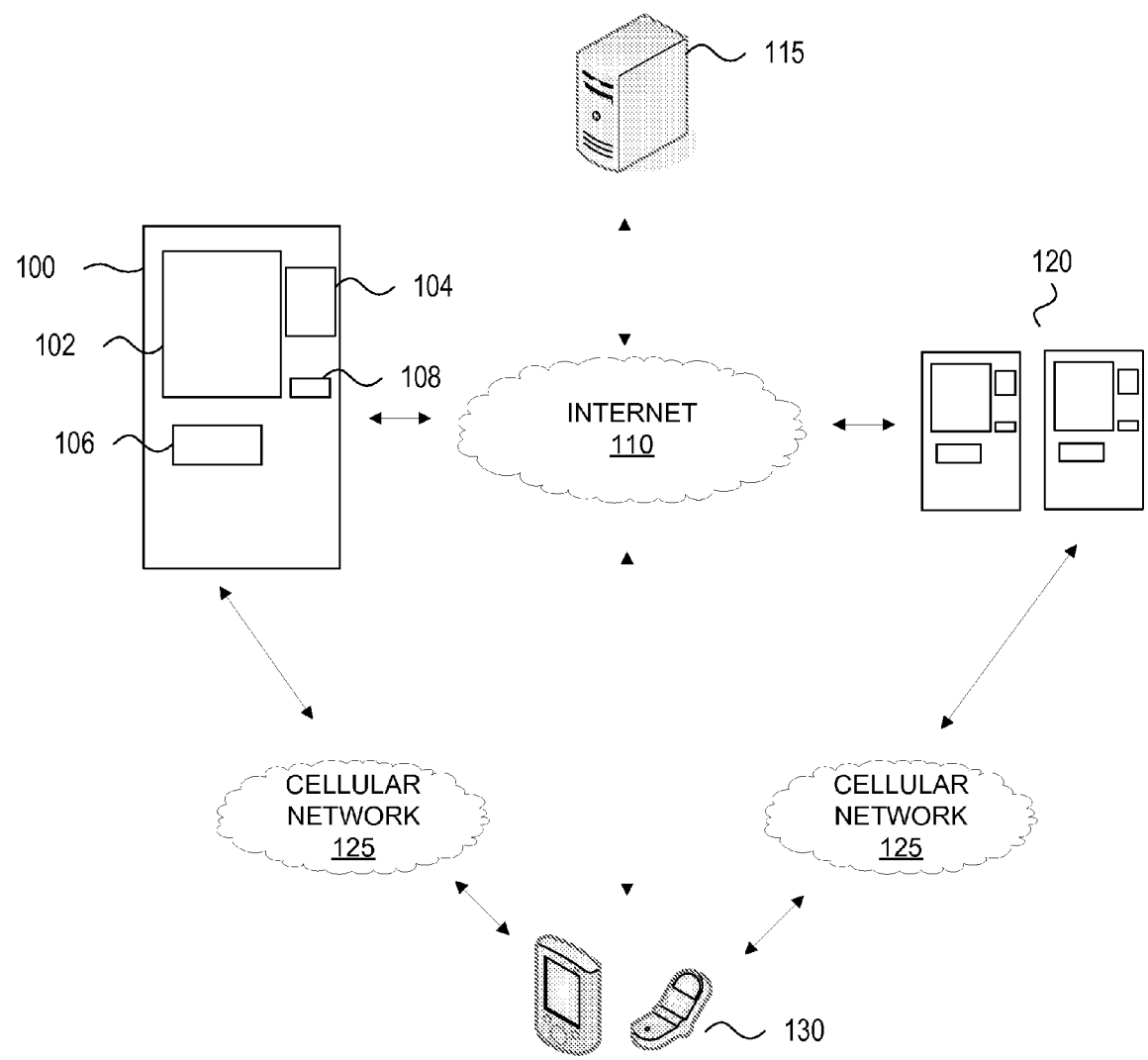
FIG. 1 illustrates a high-level block diagram of a network environment including an ATM 100 that may be used according to an illustrative embodiment of the invention.

FIG. 1 illustrates a block diagram of a network environment including an ATM 100 that may be used according to an illustrative embodiment of the invention. The phrase "ATM" used herein may include bank kiosks or any other physical interface device which allows a user to connect to a financial institution database to carry out the functionality described herein, such as receiving or dispensing physical cash, checks, or other financial instruments. The ATM may have a display interface 102, a user input interface 104, and a funds dispenser 106 and a funds receptor 108 for receiving funds and/or other financial instruments. The ATM may have a processor for controlling overall operation of the ATM and its associated components, including RAM, ROM, and memory (not shown). Software may be stored within the memory and/or storage to provide instructions to the processor for enabling the ATM to perform various functions. For example, the memory may store software used by the ATM, such as an operating system, application programs, and an associated database. Alternatively, the memory may store software used by the ATM to communicate with other devices, such as servers, computers, or other ATMs. In another aspect, some or all of ATM's computer executable instructions may be embodied in hardware or firmware.

ATM 100, as shown in FIG. 1, may be connected via the internet 110 and/or other networks to a financial institution database within server 115 storing funds-transfer information such as the sender identification, recipient identification, authentication information, and any other information related to the funds transfer. For example, other networks may include a local area network (LAN) and a wide area network (WAN). It will be appreciated that the network connections shown are illustrative and other means of establishing a communications link between the various devices may be used. Server 115 may also be accessible to other ATMs 120 via internet 110 and/or other networks such as a local area network (LAN) or a wide area network (WAN). The ATMs 100 and 120 may also be configured to send out text messages to a desired destination over the internet 110 or cellular networks 125, which may include a mobile phone or mobile communication device 130, an email address, and the like.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In addition, the invention may be described in the general context of computer-executable instructions, such as program modules, being executed by a processor. Generally, program modules include routines, programs, objects, components, data structures, etc. which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The technology, such as the devices and networks described in FIG. 1 may allow an institution to process a funds transfer request from a sender and facilitate the receipt of the funds amount by a recipient without requiring the assistance of human financial agents. A funds transfer may include the sending of funds by one individual to a second individual, such as, for example, cash transfers, wire transfers, and the like. Funds may include and may be used interchangeably herein with paper money, cash, coins, checks, money orders, and the like.

A funds transfer may be divided into a funds transfer initiation process to receive the funds to be transferred and recipient information from a sender and a funds retrieval process to provide the funds to a recipient. The two processes may be performed by any particular ATM. That is, the ATM utilized for a funds transfer initiation step for Transfer A at a particular location, may be the ATM utilized for funds retrieval for Transfer B.

Figure 2:
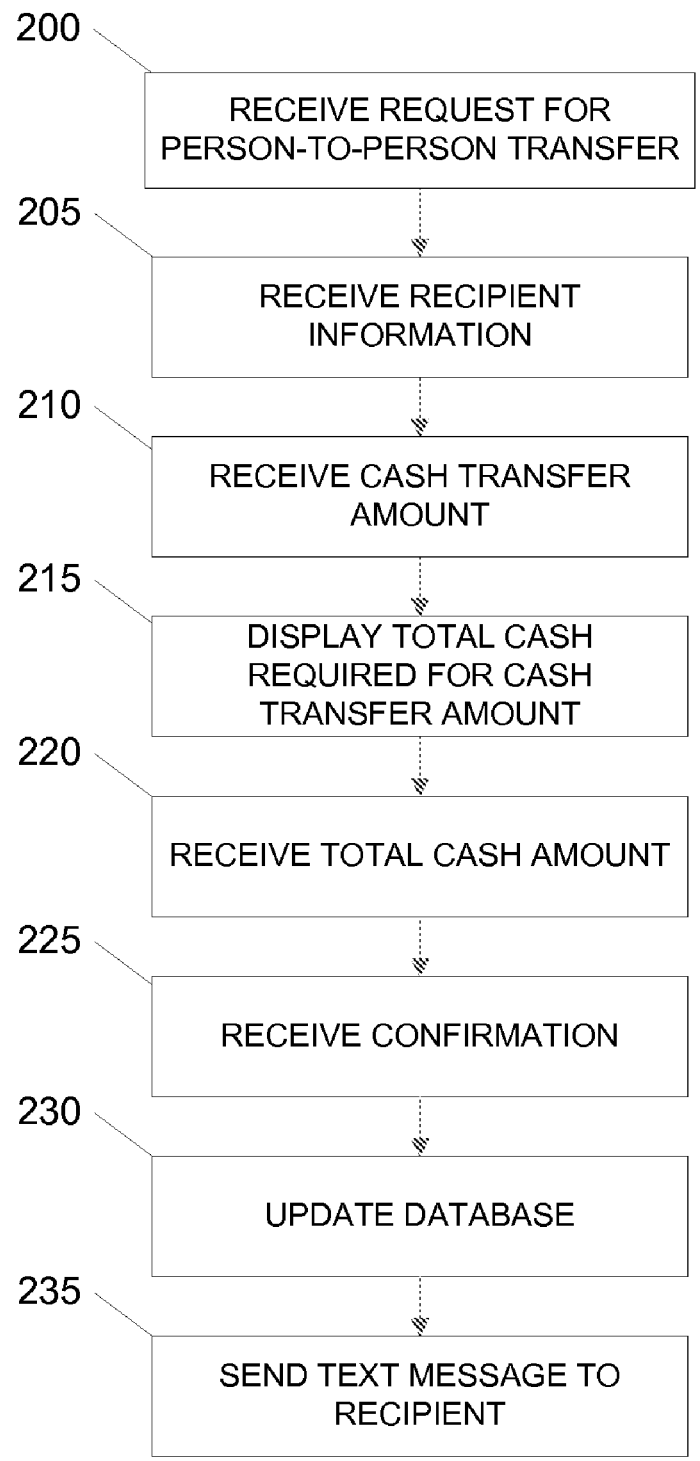
FIG. 2 illustrates a method of initiating a funds transfer according to one or more aspects of the invention.

FIG. 2 illustrates a method of initiating a funds transfer. At block 200, the ATM may receive a request for a funds transfer. Here, the sender may initiate a request for a funds transfer without identifying that the sender has an account with the financial institution. For example, the sender may indicate that the sender wishes to transfer funds to a recipient by pressing a "funds transfer" soft-key on the ATM interface. At block 205, the ATM may request an input designating a recipient and recipient-related information. This input may, for example, include the recipient's name, phone number, instant messaging screen name, email address, country, state, local address, and/or the money to be transferred. The sender may, for example, use a soft or hard keyboard to enter the information at the ATM. At block 210, the ATM may receive a funds transfer amount that the sender wishes to send to the recipient. In one example, the sender may utilize the same soft or hard keyboard to enter the desired transfer amount. Upon receiving the funds transfer amount, at block 215, the ATM may display or output a total funds required amount which includes the funds transfer amount and any taxes or fees required by the financial institution facilitating the transfer and/or the state or federal government. Alternatively, the ATM may request that the sender enter a total funds amount and upon receiving the total funds amount, the ATM may return to the sender the funds transfer amount calculated by subtracting any taxes or fees from the total funds amount.

At block 220, the ATM may request that the sender input the total funds amount. In one example, the ATM may have a cash and/or coin receptor to receive dollar bills and/or coins and a counter for counting the amount of cash inputted by the sender. Additionally, the sender may input a check, credit card or debit card in lieu of, or in addition to, any cash deposited into the ATM for transferring funds to a recipient. At block 225, the ATM may determine that the sender has deposited the required amount of funds for the funds transfer and may request confirmation from the sender to finalize the funds transfer initiation process. Additionally, for funds accounting, the ATM may create a temporary account into which the funds may be deposited and later withdrawn by the recipient. For example, the money may be stored in an escrow account. After receiving confirmation, at block 230, the ATM may record the receipt of the funds in a database accessible to a network of ATMs and other bank systems. If necessary, the ATM may also update the same or different database with the details of the funds transfer initiation process, including, but not limited to sender information, recipient information, a retrieval code, terms and conditions for retrieval (including, but not limited to, dates, locations, authentication requirements, and the like), status of the funds transfer, and the like. At block 235, the ATM may send a text message to the recipient designated by the sender at block 205, or may instruct a device capable of sending a text message to send the text message. Alternatively, the sender may elect not to have the ATM send a text message to the recipient at block 235, and may independently contact the recipient.

The text message may, for example, notify the recipient that the sender has completed the transfer initiation process and that the funds are available for retrieval. The text message may further include the transfer amount, a retrieval code, terms and conditions for retrieval (including, but not limited to, dates, locations, identification, and the like), and sender information such as name, phone number, email, and the like. The retrieval code may be a randomly generated text-string which the recipient may be requested to enter before retrieving the funds.

In order to prevent text messages from being sent to incorrect phone numbers, the ATM may verify that the inputted phone number matches the name and/or address of the recipient. The ATM may verify such information simply by sending a query for the information to a database (e.g., database owned or accessed by telecommunication companies, public database with such information listed, and the like) and comparing the received information with the information inputted by the sender.

In one aspect, the ATM may track the sender and recipient by name, date of transaction, and the amount of money transferred. Such tracking information may be used to determine potential illegal activity. For example, the ATM may determine that a pre-determined threshold has been exceeded by a particular sender or recipient and may forward that information to the appropriate authorities for further investigation. The pre-determined threshold may include an aggregate amount transferred within a period of time. In another example, the threshold may include both sent and received amounts of cash with respect to one individual.

In one aspect, as part of the funds transfer initiation process, the sender may be requested to customize or select the level of authentication required from the recipient when the recipient attempts to collect the transferred funds. Such a request may, for example, be made before the ATM performs the process described by block 230 of FIG. 2.

Figure 3:
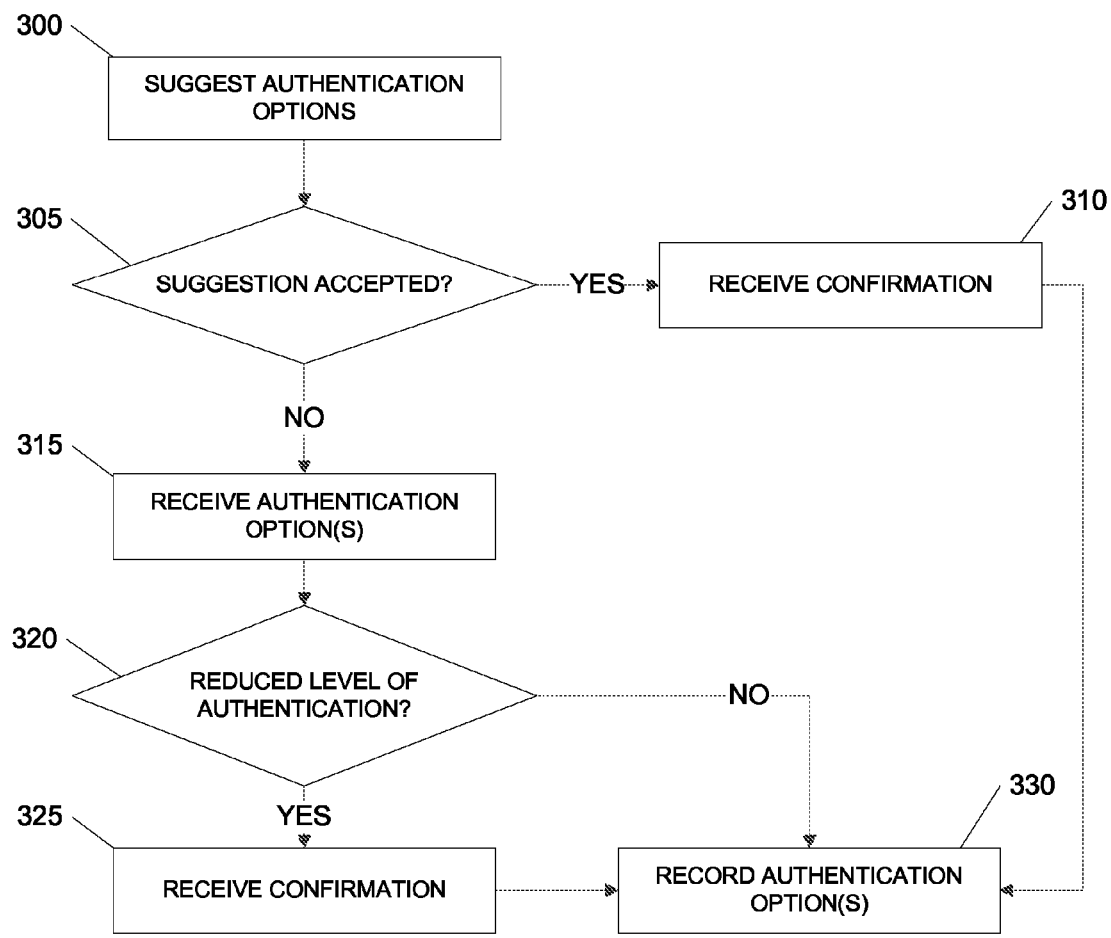
FIG. 3 illustrates a method of customizing the level of authentication according to one or more aspects of the invention.

FIG. 3 illustrates a method of customizing the level of authentication. At block 300, the ATM may suggest a level of authentication and/or authentication options corresponding to the dollar amount to be transferred. FIG. 4 shows a table which may serve as the basis for a suggestion of the level of authentication or authentication options. Funds transfers between $0-$100 may trigger a suggestion of low level of authentication which may be preferable in situations where low amounts of funds are being transferred and/or to maximize convenience for the recipient. A low level of authentication may include, for example, entering a recipient code. A medium level of authentication may include, for example, entering the correct answer to a sender-customizable question. High levels of authentication may be preferable when larger amounts of funds are being transferred or where higher levels of security are desired and may include, for example, matching a voice print. Additionally, more than one authentication option may be available for a particular level of authentication. For example, a medium level of authentication may include both a recipient code and the correct answer to a sender-customizable question.

Referring back to FIG. 3, at block 305, the ATM may determine whether sender accepts the suggestion. If the sender accepts the suggestion, then at block 310, the ATM confirms the selection and proceeds to set the level of authentication and/or authentication options. If the sender does not accept the suggestion and instead wishes to customize the authentication level required by the recipient to retrieve the funds, at block 315, the ATM may receive one or more selections of the level of authentication that the sender desires. The sender may select any authentication option available. At block 320, the ATM may determine whether the sender selected a reduced level of authentication as compared to the suggested level of authentication. If so, the sender may be requested to confirm the reduced level at block 325. At block 330, the ATM sets the authentication requirements for retrieving the funds by the recipient.

In addition to authentication options such as entering a code or providing an answer to a customizable question, other more secure authentication options may be available. For example, biometrics, such as matching a voice print, may be used to authenticate the recipient. Such an authentication process may begin with the ATM searching through a database to determine if the database has a recorded voice print for the recipient. If no voice print is found for the recipient, the ATM may call the recipient and conference in the sender using the phone numbers provided by the sender and may prompt the recipient to say the recipient's name and subsequently record the recipient's response for use as a voice print. The sender may be asked to confirm the recipient's voice print. The voice print may be saved and associated with the name and number of the recipient. If the search through the database results in locating an existing voice print for the recipient, no phone call is needed to be made to the recipient. When the recipient attempts to retrieve the funds transfer, the voice of the recipient may be received by, for example, a microphone and compared to the voice print stored in the database to authenticate the recipient before allowing the recipient to receive the funds.

Other examples of biometrics may include, but not limited to handprints, retinal scans, and the like. With respect to these and other types of biometric authentication options, the ATM may include a handprint reader, retinal scanner, and the like. Additionally, the reader, scanner or any other biometric detection device may communicate with a database to determine whether the recipient's handprint or retina pattern or other detected biometric measurement matches a previously stored version to determine whether the recipient is authenticated.

In another aspect, radio-frequency identification (RFID) may be used to authenticate the recipient. The ATM may be equipped with a RFID reader. In addition, the recipient may need a chip or other device containing a RFID tag. Devices such as mobile communication devices may include RFID chips with RFID tags. If such an authentication method is selected, the database storing the recipient may be authenticated by bringing the RFID tag in range of the RFID reader. Upon moving it into range, the RFID tag may transmit a response which may include an identification number.

Figure 5:
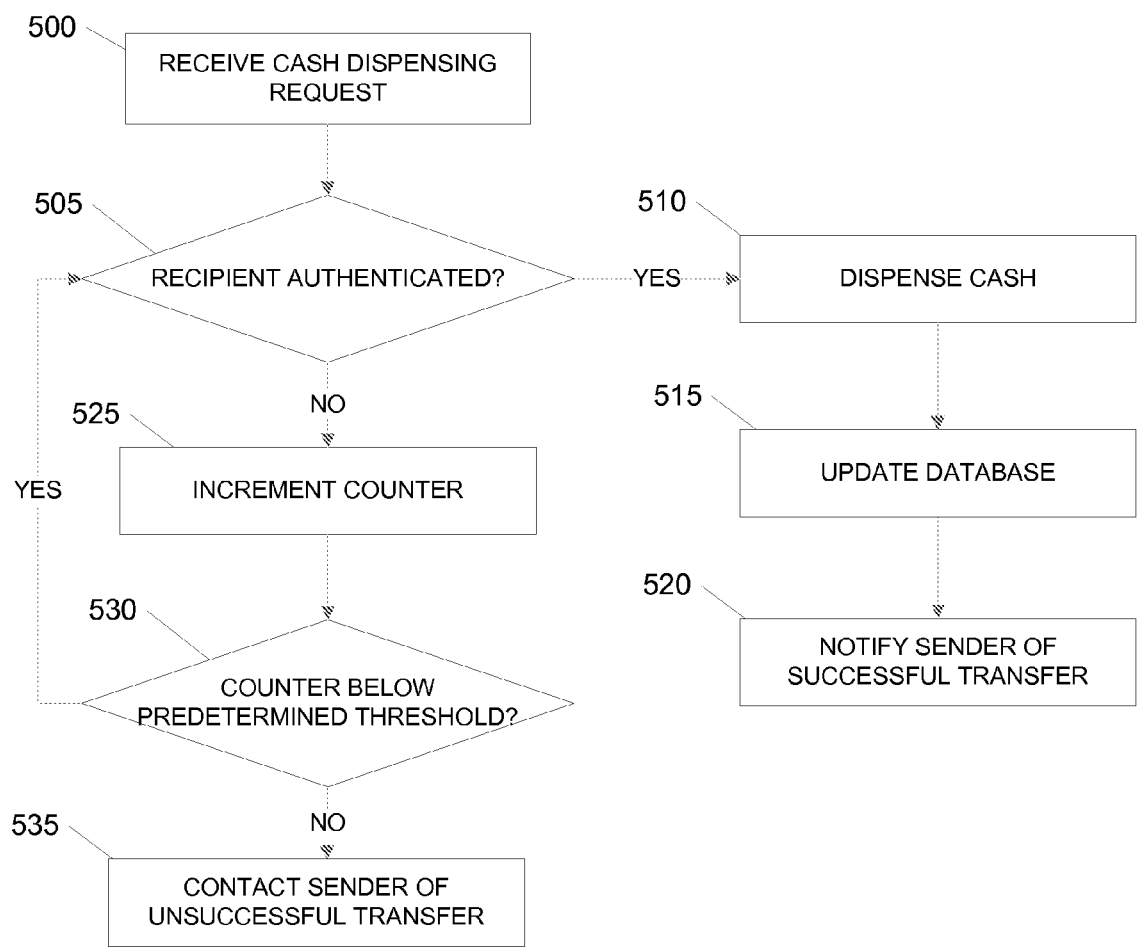
FIG. 5 illustrates a method for a funds retrieval process according to one or more aspects of the invention.

After the recipient receives notification (via text message, email, or the like) that the transferred funds are available for retrieval, the recipient may seek to retrieve the funds. FIG. 5 illustrates a method for retrieving the transferred funds. At block 500, the ATM may receive a request from the recipient to retrieve the funds. For example, the recipient may select an option on the ATM interface which indicates that the recipient desires to withdraw funds deposited by a sender. At block 505, the ATM may determine if the recipient is authenticated, for example, according to the customized level of authentication. The authentication process may include requiring the recipient to provide the correct retrieval code or the correct answer to a customizable question. Alternatively, the authentication may include requiring the recipient to submit his handprint or voiceprint to a biometric detection device which may communicate with a database to determine whether the handprint or voiceprint matches a previously stored version. If the ATM authenticates the recipient, then at block 510, the ATM may dispense the funds. At block 515, the ATM may update a database containing a record or file of the transaction to indicate that the funds were dispensed to the recipient. In addition, details of the transaction may be recorded, such as the time and location of the retrieval. At step 520, the ATM may send notification to the sender that the recipient has retrieved the funds and that the transfer process is complete.

If the recipient is not authenticated, the recipient may be given a pre-determined number of attempts to provide the required information for authentication. At block 525, the ATM may initiate a counter to track the number of attempts made to authenticate the recipient. At block 530, the ATM may verify that the number of attempts is below the pre-determined threshold. If the number of attempts is below the threshold, the ATM re-executes block 505, requesting input in order to authenticate the recipient. If the number of attempts exceeds the pre-determined threshold, the ATM might not allow the recipient to re-attempt authentication and may contact the sender or authorities at block 535. For example, the ATM may send notification (via text messaging, email, or the like) to the sender indicating that the recipient could not be authenticated. The ATM may receive a selection by the sender as to how the sender desires to handle the situation. In one example, the sender may be requested to return to the closest ATM to provide further instructions. In another example, the sender may receive a text message containing options and may reply to the text message to select the desired option.

For instance, one option available to the sender when the recipient fails to meet the authentication and/or conditions for retrieving the funds is to re-collect the funds and not transfer it to the recipient. To transfer the funds back to the sender, the ATM may send to the sender a message containing a new recipient code, which may be a randomly-generated alphanumeric text string. The ATM may also update the record or file within the database accordingly to indicate that the transfer process was not completed because an unauthorized individual attempted to retrieve the funds and that the funds were sent back to the sender. The sender may retrieve the funds upon inputting the code into an ATM.

Examples of other options available to the sender when the recipient fails to meet the authentication requirements include changing the level of authentication, maintaining the same level of authentication but changing the details (e.g. changing a password or changing a question or answer to a customizable question), or imputing an override code if the sender wishes to complete the transfer notwithstanding the lack of authentication. After receiving the sender's selected option, the ATM may update the database, and execute the selected option. For example, if the sender selected a new retrieval code, the ATM may send a message to the recipient containing the new recipient code.

Although not required, one of ordinary skill in the art will appreciate that various aspects described herein may be embodied as a method, a data processing system, or as a computer-readable medium storing computer-readable instructions. Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. In addition, the steps described herein may be performed using a process executing computer-executable instructions stored on a computer-readable medium. The processor may also be in communication with a display screen as part of the ATM for outputting the appropriate information in accordance with aspects of the invention.

We claim:

1. A method, comprising:
   receiving, by a first automated teller machine (ATM), a request to initiate a person-to-person funds transfer;
   receiving, by the first ATM, a phone number associated with a recipient of the funds transfer;
   receiving, by the first ATM, a transfer funds amount to be transferred to the recipient;
   displaying, by the first ATM, a total funds amount corresponding to the transfer funds amount, wherein the total funds amount is the transfer funds amount combined with a predetermined fee;
   receiving, by the first ATM, funds totaling the total funds amount;
   generating, by the first ATM, a recipient code, the recipient code being configured to be entered into a second ATM by the recipient of the funds transfer prior to retrieving the transfer funds amount from the second ATM;
   updating, by the first ATM, a database to reflect the transfer funds amount, the phone number associated with the recipient, and the recipient code; and
   causing, by the first ATM, a text message to be sent to the phone number, wherein the text message includes the recipient code.

2. The method of claim 1, wherein receiving the funds includes receiving physical cash.

3. The method of claim 1, wherein receiving the funds includes receiving authorization to deduct the total funds amount from a sender's account.

4. The method of claim 1, further comprising receiving, by the first ATM, one or more authentication selections, wherein the second ATM requires the one or more authentication selections to be met by the recipient before dispensing the transfer funds amount to the recipient.

5. The method of claim 4, further comprising suggesting, by the first ATM, at least one authentication selection, wherein the at least one suggested authentication selection is based on the transfer funds amount.

6. The method of claim 4,
   wherein at least one of the one or more authentication selections includes a customizable question, and
   wherein the second ATM requires the recipient to provide a correct answer to the customizable question to be authenticated.

7. The method of claim 4,
   wherein at least one of the one or more authentication selections includes voice print authentication, and
   wherein the second ATM verifies, at a time when the recipient attempts to retrieve funds, a voice print of the recipient using a stored voice print of the recipient.

8. The method of claim 7, further comprising:
   establishing, by the first ATM, a phone conversation with the recipient;
   conferencing in, by the first ATM, a sender of the transfer funds amount to the phone conversation with the recipient;
   recording, by the first ATM, a voice sample of the recipient during the phone conversation; and
   receiving, by the first ATM, confirmation of the voice sample from the sender.

9. The method of claim 4, wherein at least one of the one or more authentication selections requires the recipient to bring an RFID tag within proximity of an RFID reader communicatively coupled to the second ATM.

10. The method of claim 1, further comprising:
    after receiving the phone number associated with the recipient, verifying, by the first ATM, with a third party that the phone number is associated with one of the recipient's last name and address.

11. The method of claim 1, further comprising:
    determining, the second ATM, that the recipient failed to retrieve the funds;
    causing, by the second ATM, a second text message to be sent to a sender of the transfer funds amount;
    receiving, by the second ATM, an option specifying how to proceed with the person-to-person funds transfer; and
    updating, by the second ATM, a database that stores information about the person-to-person funds transfer to reflect the received option.

12. The method of claim 11, wherein the received option specifies that the funds transfer is to be canceled and the sender is to be allowed to retrieve the funds.

13. The method of claim 11, wherein the received option specifies that the authentication option originally selected is to be modified.

14. A method, comprising:
    receiving, by a first automated teller machine (ATM), from a recipient, a request to retrieve funds based on a retrieval code;
    receiving, by the first ATM, the retrieval code, wherein the retrieval code was generated by a second ATM that was used by a sender of the funds to initiate a transfer of the funds;
    determining, by the first ATM, an amount of funds to be dispensed based on the retrieval code;

dispensing, by the first ATM, the amount of funds determined to be dispensed; and updating, by the first ATM, a record associated with the retrieval code to indicate that the funds were withdrawn.

15. The method of claim 14, further comprising authenticating, by the first ATM, the recipient prior to dispensing the amount of funds.

16. The method of claim 15, wherein authenticating the recipient includes receiving, by the first ATM, a correct answer to a sender-customizable question.

17. The method of claim 15, wherein authenticating the recipient includes:
   requesting, by the first ATM, a voice print from the recipient;
   recording, by the first ATM, the voice print;
   comparing, by the first ATM, the voice print with a previously recorded voice print; and
   authenticating, by the first ATM, the recipient if the two voice prints match.

18. The method of claim 15, wherein authenticating the recipient includes:
   reading, by the first ATM, an RFID tag; and
   confirming, by the first ATM, that a piece of information read from the RFID tag matches stored recipient identification information.

19. A system, comprising:
   a first automated teller machine (ATM) for initializing a person-to-person funds transfer, the first ATM comprising:
      a first processor; and
      first memory storing first computer-readable instructions that, when executed by the first processor, cause the first ATM to:
         receive a request to initiate the person-to-person funds transfer;
         receive a phone number associated with a recipient of the funds transfer;
         receive a transfer funds amount to be transferred to the recipient;
         display a total funds amount corresponding to the transfer funds amount, wherein the total funds amount includes the transfer funds amount and a predetermined fee;
         receive funds totaling the total funds amount;
         generate a recipient code, the recipient code being configured to be entered into a second ATM by the recipient of the funds transfer prior to retrieving the transfer funds amount from the second ATM; and
         update a database to reflect the transfer funds amount, the phone number associated with the recipient, and the recipient code; and
   the second ATM for retrieving an amount of funds transferred, the second ATM comprising:
      a second processor; and
      second memory storing second computer-readable instructions that, when executed by the second processor, cause the second ATM to:
         receive, from a recipient, a request to retrieve funds based on a retrieval code;
         receive, as the retrieval code, the recipient code generated by the first ATM;
         determine an amount of funds to be dispensed based on the retrieval code;
         dispense the amount of funds determined to be dispensed; and
         update a record associated with the retrieval code to indicate that the funds requested to be retrieved were withdrawn.

20. The system of claim 19, wherein the second memory stores additional computer-readable instructions that, when executed by the second processor, further cause the second ATM to:
   authenticate the recipient prior to dispensing the amount of funds, wherein authenticating the recipient includes confirming that a piece of information read by the second ATM from an RFID tag matches stored recipient identification information.

21. The system of claim 19,
   wherein the first memory stores additional computer-readable instructions that, when executed by the first processor, further cause the first ATM to suggest, based on the transfer funds amount, at least one authentication selection, and
   wherein the second memory stores additional computer-readable instructions that, when executed by the second processor, further cause the second ATM to require one or more authentication selections to be met by the recipient prior to dispensing the amount of funds determined to be dispensed.

* * * * *

UNITED STATES PATENT AND TRADEMARK OFFICE
CERTIFICATE OF CORRECTION

PATENT NO. : 8,073,770 B2  
APPLICATION NO. : 12/349571  
DATED : December 6, 2011  
INVENTOR(S) : Cole et al.

It is certified that error appears in the above-identified patent and that said Letters Patent is hereby corrected as shown below:

Column 8, Claim 11, Line 43:
        Please delete "the second ATM," and insert -- by the second ATM, --

Signed and Sealed this  
Twenty-eighth Day of February, 2012

David J. Kappos  
*Director of the United States Patent and Trademark Office*